UNITED STATES PATENT OFFICE.

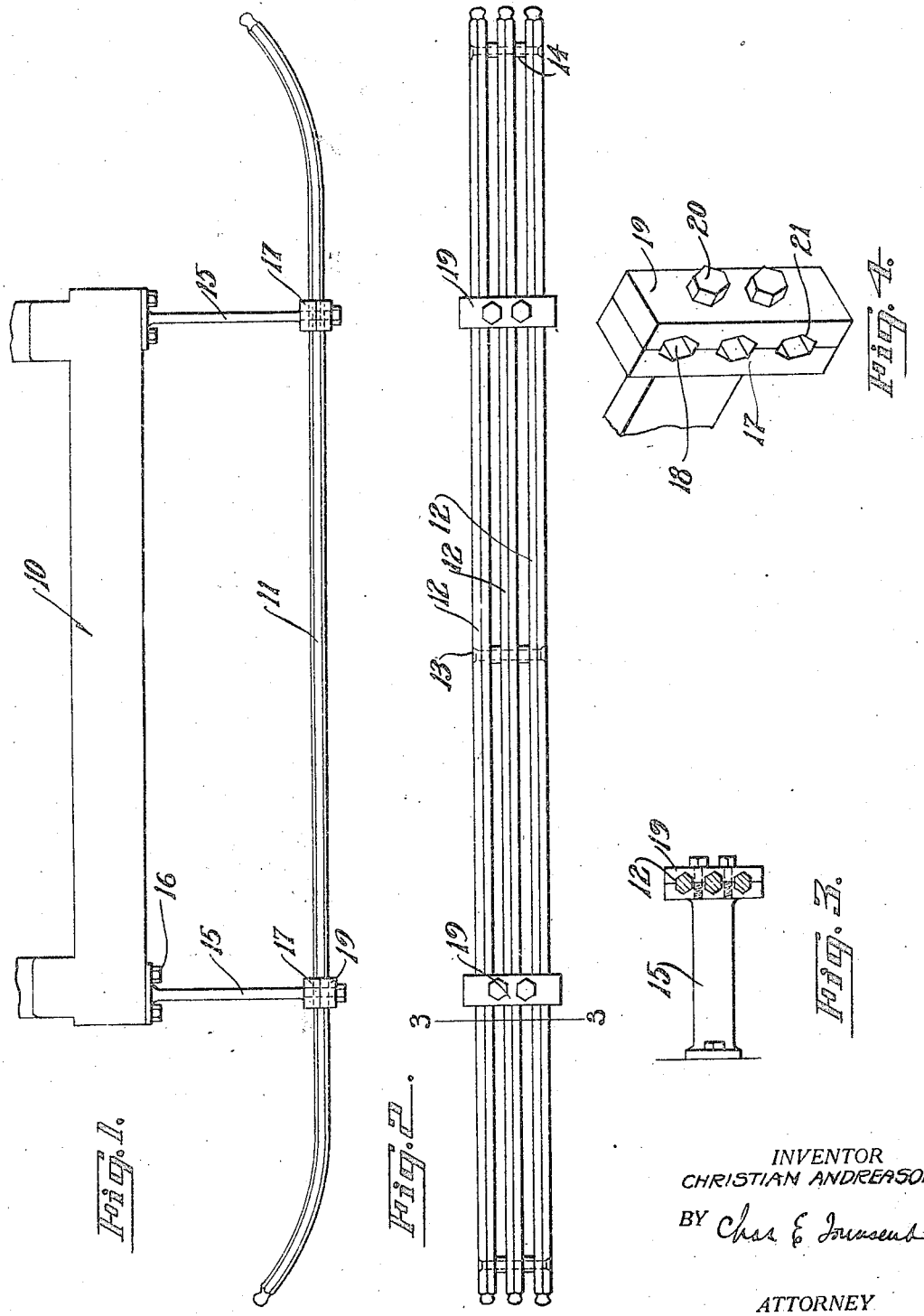

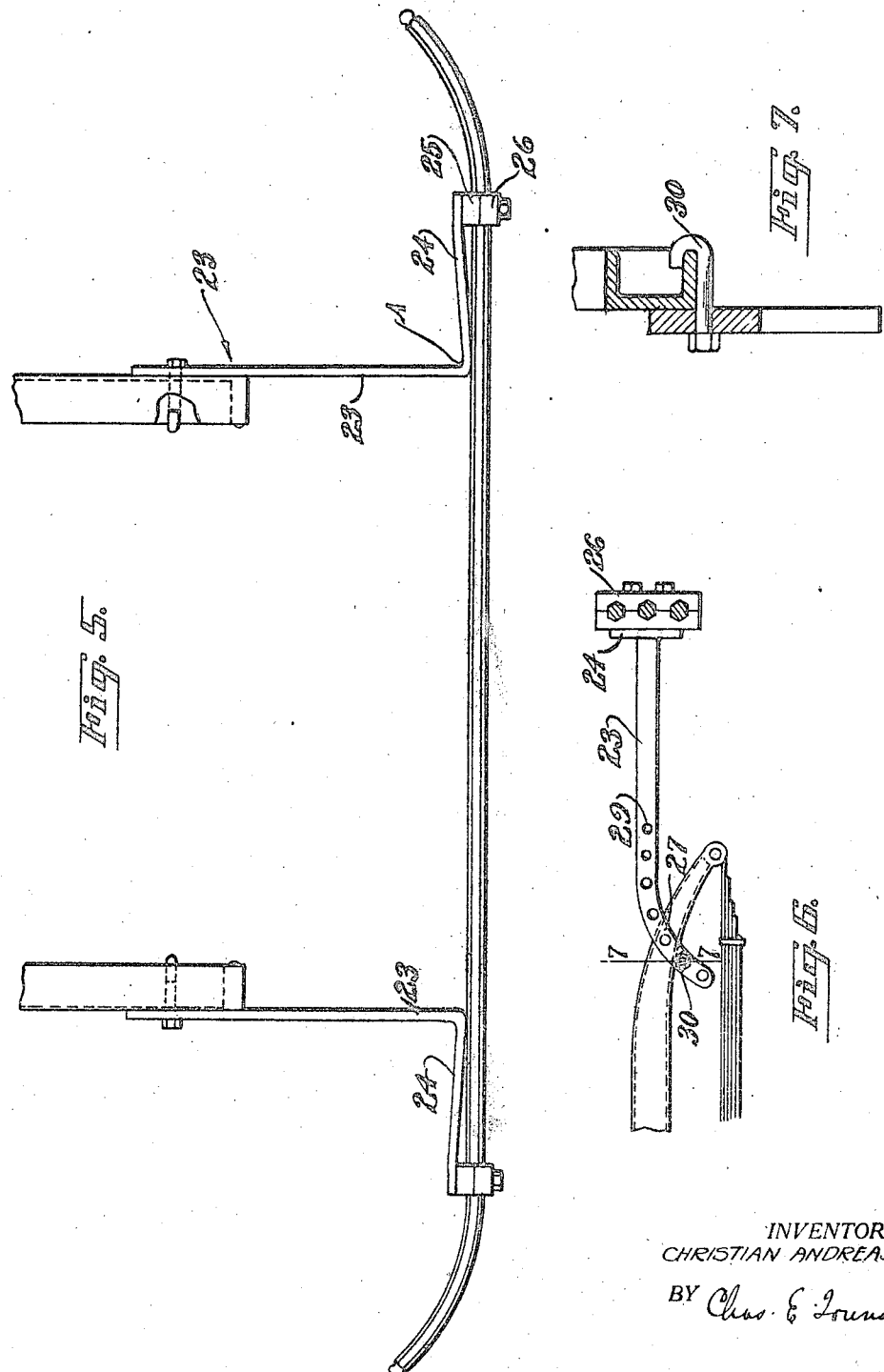

CHRISTIAN ANDREASON, OF SACRAMENTO, CALIFORNIA.

VEHICLE BUMPER.

1,412,820.  Specification of Letters Patent.  Patented Apr. 18, 1922.

Application filed November 29, 1920. Serial No. 426,904.

*To all whom it may concern:*

Be it known that I, CHRISTIAN ANDREASON, a citizen of the United States, residing at Sacramento, in the county of Sacramento and State of California, have invented new and useful Improvements in Vehicle Bumpers, of which the following is a specification.

This invention relates to vehicle construction, and particularly pertains to a bumper for automobiles.

It is the principal object of the present invention to provide an improved bumper, which may be applied to the front or the rear of an automobile frame by adjustable means, and in a manner to insure that collision with pedestrians or vehicles will be warded off, the bumper structure being decidedly simple, strong, and of light weight, at the same time producing a very sightly appearance.

The present invention contemplates the use of bumper brackets, which may be readily applied to various makes of cars, without alteration, and to the outer ends of which brackets a transverse composite bumper bar is detachably secured.

The invention is illustrated by way of example in the accompanying drawings, in which:

Figure 1 is a view in elevation showing one application of the present invention.

Fig. 2 is a view in plan showing the composite formation of the bumper.

Fig. 3 is a view in transverse section through the bumper bar on the line 3—3 of Fig. 2.

Fig. 4 is an enlarged view in perspective showing the adjustable mount for the bumper bar at the end of the brackets.

Fig. 5 is a view in plan showing another form of the bumper bar.

Fig. 6 is a view in side elevation showing the application of the bracket disclosed in Fig. 5.

Fig. 7 is a view in transverse section on the line 7—7 of Fig. 5.

Referring more particularly to the drawings 10 indicates a vehicle main frame. The frame shown in Fig. 1 is a formed with a transverse member secured to the ends of the side rails of the frame. The frame shown in Fig. 5 is formed with forwardly projecting horns upon which the bumper is supported. The bumper bar as indicated at 11, is composed of a plurality of relatively small sectioned rods 12. These rods may be of any number, and in the present instance three are indicated. All of the rods extend parallel to each other and are permanently held in vertically spaced relation to each other by rivets 13, which extend through the several rods and through spaced bushings 14 interposed between the rods. It is desirable to provide rods having some inherent resiliency, and it is preferable that the individual strength of the rods is such that under excessive shock the bumper may be distorted, thereby absorbing the shock without damaging the vehicle. It will thus be evident that due to the strength of these rods, they may be easily bent to assume their original aligned positions. In Figures 1 to 4 inclusive, the rods are shown as being hexagonal, although it will be understood that any formation may be employed, as the fancy of the manufacturer dictates.

Due to the fact that vehicle frames differ in design, it is desirable to form the bumper in a manner to be adjustable to various widths of frame, as well as design. In Fig. 1 a square frame is shown, and applied thereto are rigid brackets 15, which extend forwardly from the frame and are secured thereto by cap screws 16. These brackets are preferably drop forgings or of cast metal, and are formed at their outer ends with a vertically extending seat pad 17. This pad is provided with a plurality of parallel recesses 18, which are intended to accommodate the various rods 12 of the bumper, the recesses being of a contour representing substantially one half of the sectional formation of the rods. A flat vertical face is formed upon the member 17 and is adapted to register with a clamping cap 19, which is secured against said face by cap screws 20. This cap is formed with recesses 21, substantially agreeing in configuration with the recesses 18, and in register therewith. It is to be understood that in order to clamp the bars in position, the recesses 18 and 21 may not be the depth of one half the diameter of the bars, thereby causing a space to occur between the adjacent faces of pad 17 and the cap 19.

In the form of the invention shown in Figures 5 to 7, inclusive, an adjustable bracket 22 is provided. This bracket is preferably formed of spring steel, and has a forwardly extending arm 23, adapted to take the thrust of force applied to the bumper, and an outwardly extending arm 24 to yieldably reinforce the horns of the bumper. This outwardly extending arm is equipped with a pad 25, similar in formation to the pad 17, previously described, and complementary to cap 26, similar to the cap 19. The width of the bracket 22 substantially agrees with the over all width of the composite bumper bar, thus at the bend A the rods 12 will all rest against the end of the arm 23, while the portion 24 will extend along the back of the bar to reinforce it. The rear portion of the bracket 22 is more clearly shown in Fig. 6, where it will be seen to have a turned end 27, carrying bolt holes. A plurality of bolt holes 29 are distributed along the straight portion 23 and due to the arrangement of these various holes, hook bolts 30 may be positioned to clamp the brackets against the horns of the vehicle frame.

In operation of the present invention, brackets 15 and 22 may be selected as required and thereafter applied to the vehicle frame in the manners shown in Figures 1 and 5. The composite bumper bar may be clamped in position and will accommodate any desired width of vehicle, thereafter acting in the manner common to this class of fender.

It will thus be seen that the device here disclosed, while simple in construction and light in weight, is yet sufficiently strong to withstand impact and at the same time to absorb and ward off force which would otherwise damage the vehicle.

While I have shown the preferred form of my invention, as now known to me, it will be understood that various changes in the combination, construction, and arrangement of parts might be made by those skilled in the art, without departing from the spirit of the invention as claimed.

Having thus described my invention, what I claim and desire to secure by Letters Patent is:

1. A bumper structure comprising a pair of forwardly extending brackets secured to a vehicle frame and a plurality of spaced transversely disposed bumper bars arranged one above the other, said bumper bars being relatively small cross-sectionally and adapted to be bent out of shape under the impact of a heavy blow and to retain such bent shape, and means for securing the bumper bars in their vertically spaced relation to said brackets.

2. A bumper structure comprising a pair of forwardly extending brackets adapted to be secured to a vehicle frame, outwardly extending laterally disposed substantially straight arms formed as a continuation of said brackets, the latter having bracing or supporting portions at the inner ends of the arms, a bumper bar fitting against the outer ends of the brackets and extending along the said arms and means for securing said bar to the ends of said outward extensions of the brackets.

3. A bumper structure comprising a pair of forwardly extending brackets adapted to be secured to a vehicle frame and having relatively-straight longitudinal portions, outwardly extending arms formed as a continuation of said brackets, a bumper bar fitting against the ends of the relatively straight longitudinal portions of the brackets, and means for adjustably securing said bar to the ends of said outward extensions of the brackets.

4. A vehicle bumper comprising a plurality of separate rods relatively small in cross-section and adapted to be bent out of position and assembled in parallel relation to each other and vertically spaced and adapted to extend transversely of a vehicle frame, said rods being of a size to be bent out of shape and to retain such bent form.

5. A vehicle bumper comprising a plurality of parallel rods relatively small in cross-section and adapted to be bent out of position and rigidly held in spaced relation to each other and arranged one above the other, means for adjustably securing said structure transversely of a vehicle main frame, said rods being of a size to be bent out of shape and to retain such bent form.

6. A bumper structure including a bracket provided at its inner portion with means for mounting it on a vehicle and having at its outer portion a pad bar arranged at an angle to the bracket and provided with a plurality of recesses arranged one above the other, a plurality of transversely disposed bumper bars fitted in the said recesses, a cap bar provided with corresponding recesses fitting the bumper bars, and means for securing the cap bar to the pad bar.

7. A bumper comprising a plurality of bars of small cross-section arranged to form an increased impact surface extending entirely across the bumper and adapted to be bent out of shape from the impact of a heavy blow and to retain said bent shape.

CHRISTIAN ANDREASON.